United States Patent
Hong et al.

(10) Patent No.: US 8,703,354 B2
(45) Date of Patent: Apr. 22, 2014

(54) MEMBRANE ELECTRODE ASSEMBLY WITH ENHANCED HYDROPHOBICITY AND MANUFACTURING METHOD THEREOF

(71) Applicants: Hyundai Motor Company, Seoul (KR); Korea Institute of Science and Technology, Seoul (KR)

(72) Inventors: Bo Ki Hong, Seoul (KR); Sae Hoon Kim, Gyeonggi-do (KR); Myoung Woon Moon, Seoul (KR); Kwang Ryeol Lee, Seoul (KR); Kyu Hwan Oh, Seoul (KR); Eun Kyu Her, Incheon (KR)

(73) Assignees: Hyundai Motor Company, Seoul (KR); Korea Institute of Science and Technology, Seoul (KR)

( * ) Notice: Subject to any disclaimer, the term of this patent is extended or adjusted under 35 U.S.C. 154(b) by 0 days.

(21) Appl. No.: 13/671,945

(22) Filed: Nov. 8, 2012

(65) Prior Publication Data
US 2014/0004443 A1    Jan. 2, 2014

(30) Foreign Application Priority Data
Jun. 28, 2012    (KR) .................. 10-2012-0070376

(51) Int. Cl.
*H01M 8/10*    (2006.01)

(52) U.S. Cl.
USPC .......................................... 429/482

(58) Field of Classification Search
None
See application file for complete search history.

(56) References Cited

U.S. PATENT DOCUMENTS

| 2002/0012825 A1* | 1/2002 | Sasahara et al. ............ 429/30 |
| 2004/0028875 A1* | 2/2004 | Van Rijn et al. ............ 428/98 |
| 2007/0190735 A1* | 8/2007 | Hacker et al. ............ 438/311 |

FOREIGN PATENT DOCUMENTS

| JP | 08148176 A | 6/1996 |
| JP | 2007335171 A | 12/2007 |
| JP | 2009129853 A | 6/2009 |
| JP | 2010272437 A | 12/2010 |
| KR | 10-1117630 | 12/2005 |
| KR | 10-0814844 | 3/2008 |
| KR | 10-2009-0055301 A | 6/2009 |
| KR | 10-1071778 | 5/2010 |
| WO | 97/11503 A1 | 3/1997 |

OTHER PUBLICATIONS

Kim et al., Nano-silica layered composite membranes prepared by PECVD for direct methanol fuel cells, Electrochemistry Communications 6 (2004) 1069-1074.*
Balu et al., Fabrication of "Roll-off" and "Sticky" Superhydrophobic Cellulose Surfaces via Plasma Processing, Langmuir 2008, 24, 4785-4790.*
Blondiaux et al. Fabrication of superhydrophobic surfaces with controlled topography and chemistry, Applied Surface Science 256S (2009) S46—S53, available on line May 6, 2009.*

* cited by examiner

*Primary Examiner* — Patrick Ryan
*Assistant Examiner* — Jose Colucci Rios
(74) *Attorney, Agent, or Firm* — Edwards Wildman Palmer LLP; Peter F. Corless (57) ABSTRACT

Disclosed is a membrane electrode assembly with enhanced hydrophobicity and a method for manufacturing the same. In particular, a nano pattern with a high aspect ratio is formed in a catalyst support on the surface of a catalyst layer constituting the membrane electrode assembly using plasma etching. A hydrophobic thin film is then formed on the nano pattern formed in the catalyst support.

19 Claims, 5 Drawing Sheets

CONTACT ANGLE - 133°

CONTACT ANGLE - 160°

CONTACT ANGLE - 152°

MEMBRANE ELECTRODE ASSEMBLY WITH ENHANCED HYDROPHOBICITY AND MANUFACTURING METHOD THEREOF

CROSS-REFERENCE TO RELATED APPLICATION

This application claims under 35 U.S.C. §119(a) the benefit of Korean Patent Application No. 10-2012-0070376 filed Jun. 28, 2012, the entire contents of which are incorporated herein by reference.

BACKGROUND (a) Technical Field

The present invention relates to a membrane electrode assembly with enhanced hydrophobicity and a method for manufacturing the same. More particularly, the present invention relates to a membrane electrode assembly with enhanced hydrophobicity, which maximizes the surface area of a catalyst layer by forming a nano pattern having a high aspect ratio in a surface catalyst support of the catalyst layer to provide superhydrophobicity to the surface of the catalyst layer, and increases hydrophobicity by coating a hydrophobic thin film on the surface thereof.

(b) Background Art

In an electrochemical reaction for generating electricity in a Polymer Electrolyte Membrane Fuel Cell (PEMFC), hydrogen supplied to an anode that is an oxidation electrode is separated into electrons and protons that are hydrogen ions. Protons move to a cathode that is a reduction electrode through a polymer electrolyte membrane, and electrons move to the cathode through an external circuit. In the cathode, oxygen molecules, protons, and electrons react with one another to produce electricity, heat, and water as by-products.

A Membrane Electrode Assembly (MEA) used in PEMFC generally includes a polymer electrolyte membrane and a catalyst layer of the anode and the cathode. The polymer electrolyte membrane may include Per-Fluorinated Sulfonic Acid (PFSA) and hydrocarbon ionomer with various structures.

The catalyst layer generally includes a catalyst including a single metal using platinum (Pt) as a base material or a binary or ternary alloy, a catalyst support for supporting the catalyst, and a binder used for mixing the catalyst and the catalyst support. Particularly, as a catalyst support, carbon powder, such as carbon black, that can be stably used under a PEMFC operation environment due to its sufficient electrical conductivity, specific surface area, and durability is typically used.

Examples of such carbon powder include but are not limited to Vulcan® XC72R and Black Pearls® 2000 from Cabot® Corp, Ketjenblack® EC300J and Ketjenblack® EC600JD from Ketjen Black International, Shawinigan Black® from Chevron®, and Denka Black® from Denka®. Also, in recent years, studies on reaction surface increasing materials using Carbon Nano Tube (CNT) and Carbon Nano Fiber (CNF) as catalyst supports for increasing the performance and the durability of a fuel cell, and other materials such as Nano Structured Thin Film (NSTF) are being extensively conducted.

When water produced during the electrochemical reaction in a fuel cell appropriately exists, water plays a desirable role of maintaining the humidity of the polymer electrolyte membrane. However, when there is a surplus of water and the water is not appropriately removed, "flooding" may occur at a high current density. This flooding may hinder reactant gases from being efficiently supplied to the fuel cell, causing a greater voltage loss.

Particularly, when water is produced by an Oxygen Reduction Reaction (ORR) in the cathode of MEA, and the MEA catalyst layer has hydrophilicity or low hydrophobicity, water produced in the ORR may not be appropriately discharged, causing a mass transport loss which restricts smooth supply of atmospheric oxygen to the electrolyte membrane and thus reduces the performance of the fuel cell. Also, when water produced in the cathode continuously increases compared to that of the anode, back diffusion of water may occur from the cathode to the anode, causing flooding in the anode as well and thus hinders hydrogen from being supplied to the electrolyte membrane through the anode catalyst layer.

Accordingly, it is desirable for both cathode and anode catalyst layers to have high hydrophobicity so that water produced from the electrochemical reaction of the fuel cell can be smoothly discharged.

While typical materials such as carbon black, CNT, CNF, and NSTF can allow the MEA catalyst support to have a certain level of hydrophobicity, the MEA catalyst layer manufactured using the MEA catalyst support generally have a contact angle of 150 degrees or less with respect to water, and mostly have hydrophobicity of 120 degrees to 140 degrees. Accordingly, there is a limitation in that the water discharge performance of the MEA catalyst layer is not as superior as it should be or needs to be.

Also, it was reported that hexafluoroethane ($C_2F_6$) Radio Frequency (RF) plasma etching has been performed on carbon black. In particular, Vulcan XC-27 powder used as a catalyst support to introduce Trifluoromethyl ($CF_3$) functionality into the surface, and thus the contact angle of carbon black itself was increased from 70 degrees to 156 degrees.

However, the contact angle of actual catalyst layer when surface-treated carbon black is used for manufacturing the catalyst layer of an actual MEA, and stability of maintaining the surface structure in the MEA catalyst layer were not yet reported. Also, since the plasma surface treatment was performed on the original carbon material of the catalyst support, and the carbon material is additionally allowed to be a catalyst layer, the hydrophobic surface structure of the catalyst support may not be sufficiently realized in the actual MEA catalyst layer.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

The present invention provides a membrane electrode assembly with enhanced superhydrophobicity and a method for manufacturing the same, which increases hydrophobicity by forming a nano pattern (or fine protrusion structure) with a high aspect ratio to increase the surface area of a catalyst layer of a Membrane Electrode Assembly (MEA) constituting a fuel cell and coating a hydrophobic thin film on the surface of the nano pattern.

In one aspect, the present invention provides a method of manufacturing a membrane electrode assembly with enhanced hydrophobicity, including: forming a nano pattern with a high aspect ratio in a catalyst support on a surface of a catalyst layer constituting the membrane electrode assembly via plasma etching; and forming a hydrophobic thin film on the nano pattern formed in the catalyst support.

In an exemplary embodiment, the forming of the nano pattern may include controlling a size and a shape of the nano pattern by adjusting at least one of a plasma irradiation duration, an acceleration voltage, and an etching pressure during the plasma etching.

In another exemplary embodiment, the acceleration voltage of plasma for the plasma etching may range from about −100 Vb to about −1,000 Vb, and the etching pressure of the plasma ranges from about 1 Pa to about 10 Pa.

In still another exemplary embodiment, the plasma etching may be performed by one or a combination of an ion beam method, a hybrid plasma chemical deposition method and an atmospheric plasma method.

In yet another exemplary embodiment, the plasma etching may include Plasma-Enhanced Chemical Vapor Deposition (PECVD) or Plasma-Assisted Chemical Vapor Deposition (PACVD).

In still yet another exemplary embodiment, the hydrophobic thin film may include a hydrocarbon thin film including silicon and oxygen or a hydrocarbon thin film including fluorine. The hydrophobic thin film may have a thickness of about 1 nm to about 100 nm.

In another further exemplary embodiment, the nano pattern with the high aspect ratio may include fine protrusion structures.

In another aspect, the present invention provides a membrane electrode assembly with enhanced hydrophobicity, including a superhydrophobic surface by allowing a nano pattern with a high aspect ratio to be formed in a catalyst support on a surface of a catalyst layer and allowing a hydrophobic thin film to be formed on the nano pattern. This nano pattern with the high aspect ratio may include fine protrusion structures.

In another exemplary embodiment, the hydrophobic thin film may include a hydrocarbon thin film including silicon and oxygen or a hydrocarbon thin film including fluorine. The hydrophobic thin film may have a thickness of about 1 nm to about 100 nm.

Other aspects and exemplary embodiments of the invention are discussed infra.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the invention are discussed infra.

The present invention relates to a membrane electrode assembly with superhydrophobicity for increasing water-repellent properties of a catalyst layer of a Membrane Electrode Assembly (MEA) for a fuel cell stack and a method for manufacturing the membrane electrode assembly, which can increase hydrophobicity against water and maximize the catalyst efficiency, by forming a nano pattern with a large aspect ratio on a catalyst support of a catalyst layer of the MEA used in a Polymer Electrolyte Membrane Fuel Cell (PEMFC) to increase the specific surface area and coating a hydrophobic thin film on the surface of the nano pattern.

In an embodiment of the present invention, etching may be performed on a spherical carbon-based catalyst support in an MEA catalyst layer using a dry plasma surface treatment technology to form nano structures such as nano needles or nano pillars, i.e., nano patterns of protrusion structures with a high aspect ratio. Also, hydrophobicity may be increased by coating a hydrophobic carbon thin film on the surface of the nano structure to provide superhydrophobicity to the surface of the catalyst layer. When an MEA material with superhydrophobic surface is applied to a fuel cell, the MEA material may serve to efficiently discharge water produced during an electrochemical reaction.

In a method of reforming the surface of the MEA by plasma treatment, in order to improve hydrophobicity during an MEA manufacturing process, the surface of the MEA catalyst layer may be etched using tetrafluoromethane ($CF_4$) or oxygen plasma to form a nano pattern with a high aspect ratio and thus form a surface with a larger specific surface area. Also, a carbon thin film with hydrophobicity may be coated on the surface to stably provide superhydrophobicity via a contact angle of about 150 degrees or more.

Only with the plasma dry treatment process, the structural and chemical reforming of the MEA surface catalyst layer can be performed, allowing a fuel cell system to be easily given with appropriately high hydrophobicity. Particularly, this method has an advantage in that the superhydrophobic structure formed in the surface of the catalyst support in the catalyst layer can be used in the MEA without any additional modification or breakage, by directly reforming the surface of the catalyst layer of a finished product with the MEA instead of the original material of the catalyst support.

The increase of the surface area of the MEA catalyst layer and the increase of hydrophobicity can be construed as a technology of forming a nano structure (or nano pattern) in the surface of a solid and a mechanism of realizing high hydrophobicity or superhydrophobicity.

Generally, hydrophobicity of a solid surface depends on the chemical characteristics of the solid surface. However, when a fine pattern is formed in the surface of the solid, the hydrophobicity may greatly increase to provide superhydrophobicity. For example, regarding a surface having chemical hydrophobicity, since a surface with a fine protrusion structure or a porous structure has a larger contact angle of about 150 degrees to about 170 degrees with respect to pure water than that of an even surface, the surface may have superhydrophobicity, and simultaneously, may have a self-cleaning function by which water droplet can be more easily removed from the surface of the solid when the contact angle hysteresis is less than about 10 degrees. Accordingly, in order to manufacture a superhydrophobic surface, a surface layer with a chemically low surface energy needs to be formed, and also needs to physically/structurally have a large surface roughness.

The surface roughness may be mainly influenced by the size distribution of the fine protrusion and pores. Particularly, a lotus-leaf-like structure in which nanosize roughness exists on microsize roughness is being recently proposed. It has been reported that microscale bumps and nanoscale nanopillars exist in the lotus leaf. Also, since a chemical substance similar to wax with a surface energy is distributed over the surface of the lotus leaf, superhydrophobicity can be maintained. Such protrusion-shaped roughness and recess-shaped pore structure may also show similar characteristics. Particularly, when the nanosize and microsize pores complexly coexist, and the chemical composition of the surface is controlled, it is possible to form a hydrophobic surface or a superhydrophobic surface.

In an embodiment of the present invention, since a hydrophobicity enhancing mechanism which is obtained by simultaneous combination of the physical structure and the chemical characteristics of such a surface is applied to the surface of the MEA catalyst layer, superhydrophobicity can be given to the surface of the MEA catalyst layer. In other words, superhydrophobicity can be applied to the surface of the MEA catalyst layer by forming a nano pattern by the plasma etching and a hydrophobic carbon thin film by the plasma coating on the surface of the catalyst support in the catalyst layer. Thus, superhydrophobicity can be achieved by simultaneously performing the structural control and the chemical control.

Hereinafter, exemplary embodiments of the present invention will be described in detail with reference to the accompanying drawings.

Figure 1:
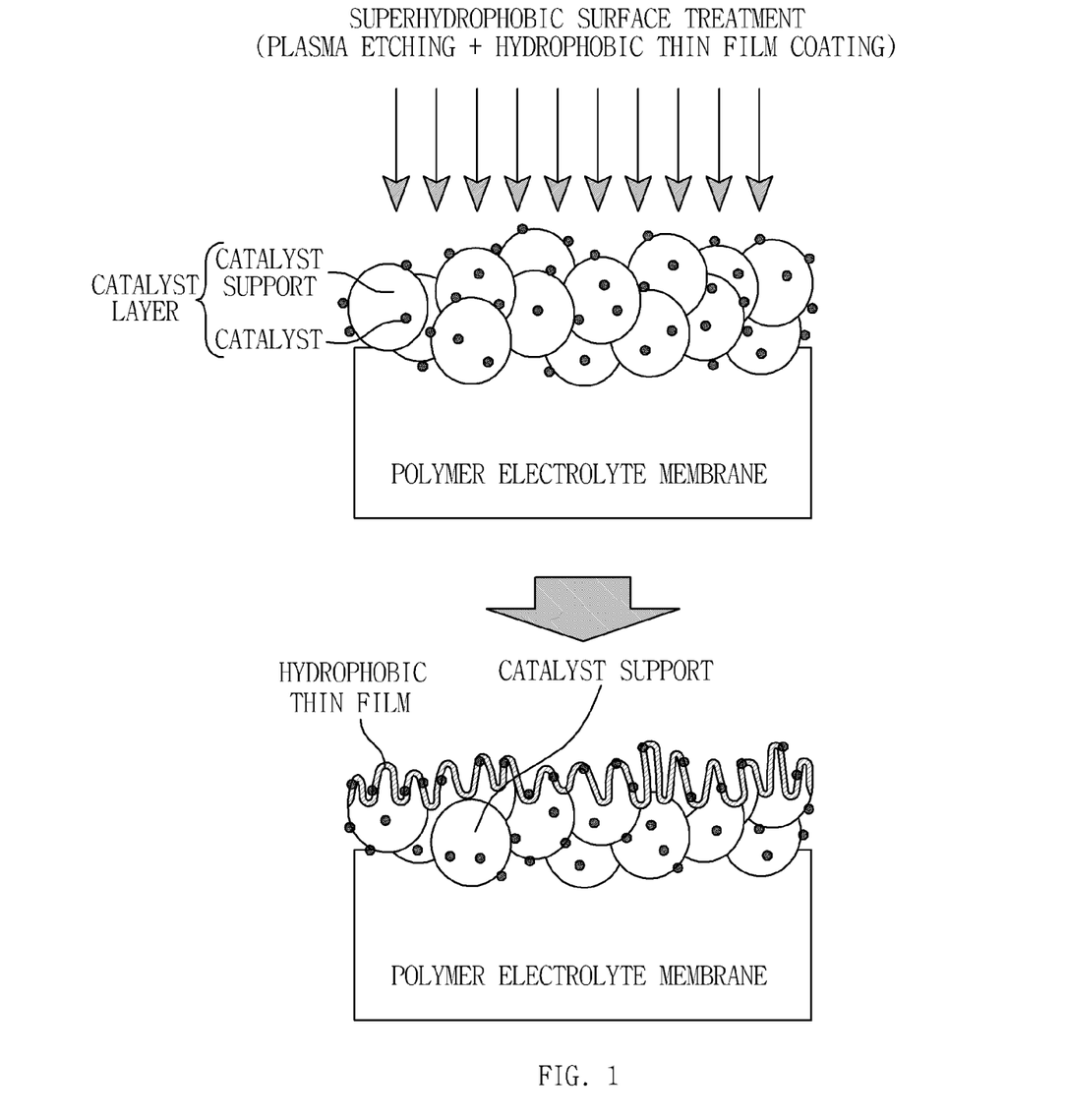
FIG. 1 is a view illustrating a process of forming a nano pattern with a high aspect ratio on the surface of a catalyst support of a catalyst layer constituting a Membrane Electrode Assembly (MEA) according to an exemplary embodiment of the present invention.

An MEA according to an embodiment of the present invention may include a nano pattern with a high aspect ratio and a hydrophobic thin film that are formed in a catalyst support on the surface of the catalyst layer. FIG. 1 is a view illustrating a process of forming a nano pattern with a high aspect ratio on the surface of a catalyst support of a catalyst layer constituting an MEA according to an embodiment of the present invention.

As shown in FIG. 1, the MEA may include a nano pattern with a high aspect ratio formed by performing plasma etching on carbon powder having a spherical particle shape constituting a catalyst support, and a hydrophobic carbon thin film formed by a plasma deposition method.

A nano pattern that has a fine protrusion structure such as a nano needle or a nano pillar having a diameter of about 1 nm to about 100 nm may be formed by performing oxygen plasma etching or $CF_4$ plasma etching on the carbon powder surface (e.g., carbon black) having a spherical shape constituting the catalyst support. The nano pattern of the catalyst support may be formed to have an uneven structure that has nanosize protrusions or pores.

Particularly, the spherical particles of the catalyst support may be carbon having a size of several tens to several hundreds of nanometer (nm). Protrusions such as nano needles or nano pillars having a width of about 1 nm to about 20 nm and a length of about 1 nm to about 1,000 nm may be formed on the surface to form a nano pattern with a high aspect ratio and thus increase the surface area accordingly. In particular, the surface area of the MEA may increase about one to ten times compared to the surface area of the MEA produced using the conventional techniques.

As shown in FIG. 1, plasma surface treatment may be performed on a catalyst layer coated on a polymer electrolyte membrane to form a nano pattern and a catalyst support particle pattern which have a dual (complex) protrusion structure different in size. Thus, a surface structure similar to the lotus leaf having superhydrophobicity and self-cleaning characteristics may be formed.

The contact angle of the surface of the catalyst support with increased hydrophobicity may reach about 150 degrees or more by coating a hydrophobic nano thin film on the surface of the catalyst support with an increased surface area as described above. The catalyst layer of a typical MEA may include a carbon-supported platinum catalyst (Pt/C) and a binder. The contact angle of this catalyst layer may range from about 120 degrees to about 140 degrees, but needs to be equal to or greater than about 150 degrees to obtain superhydrophobicity.

In an embodiment of the present invention, since the size of the nano pattern with a high aspect ratio formed by the plasma etching is significantly less than that of the surface of a typical catalyst layer, and the nano pattern has a surface roughness with a high aspect ratio, the nano pattern can obtain a contact angle of about 150 degrees or more. Also, since the surface energy becomes low by uniformly coating a hydrophobic thin film on the surface, a uniform superhydrophobic surface can be formed.

Here, the hydrophobic carbon thin film for increasing hydrophobicity may be a hydrocarbon thin film including silicon and oxygen or including fluorine (F). The thickness of the hydrophobic thin film may range from about 1 nm or to about 100 nm, preferably, from about 1 nm to about 10 nm.

An example of the hydrocarbon thin film including silicon and oxygen may be a carbon thin film including silicon and oxygen, which is deposited using Hexamethyldisiloxane (HMDSO) as a precursor. In this case, HMDSO and argon (Ar) gas may be appropriately mixed to control hydrophobicity.

A method of manufacturing an MEA with superhydrophobicity may include (a) forming a nano pattern with a high aspect ratio via performing etching on a surface catalyst support of a catalyst layer constituting the MEA; and (b) forming a hydrophobic thin film on the surface (i.e., over the nano pattern of the catalyst support on the surface of the catalyst layer) of the catalyst layer of the MEA.

The plasma etching may be performed by one or a combination of an ion beam method, a hybrid plasma chemical deposition method and an atmospheric plasma method. Also, plasma etching may include Plasma-Enhanced Chemical Vapor Deposition (PECVD) or Plasma-Assisted Chemical Vapor Deposition (PACVD), and may use oxygen ($O_2$), Ar, nitrogen ($N_2$), $CF_4$, hydrogen fluoride (HF), or silicone tetrafluoride ($SiF_4$) gases.

When magnifying a portion of the catalyst layer etched by the plasma etching, a plurality of nanosize protrusions with a high aspect ratio may be observed. The change of the protrusion distribution on the surface of the catalyst support by the plasma etching can be verified by FIGS. 2 and 3.

Figure 2:
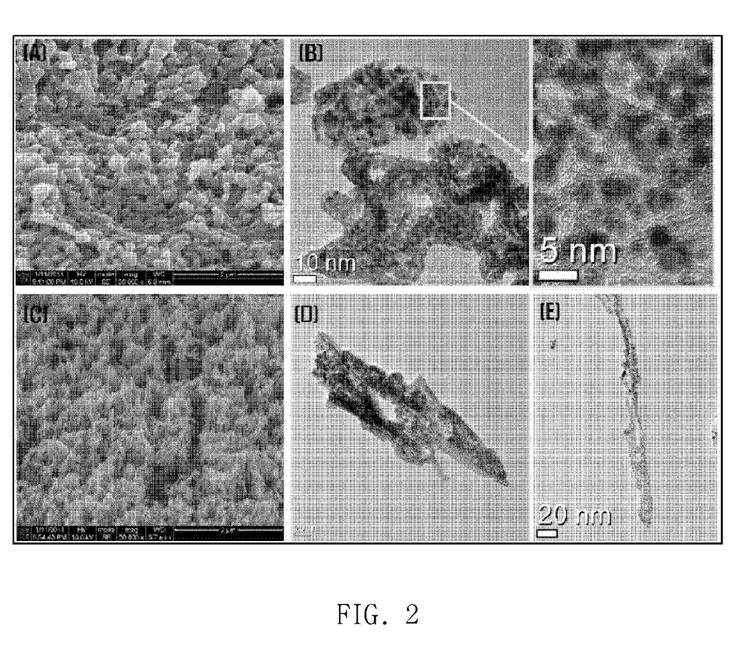
FIGS. 2 and 3 are views illustrating measurement results of a first test example.
Figure 3:
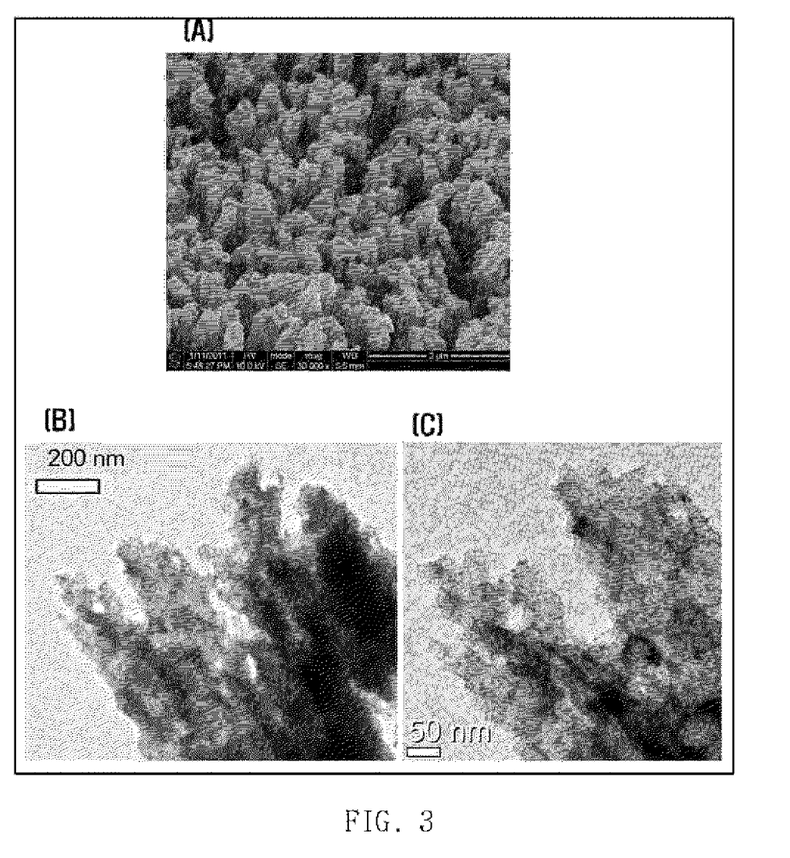

FIGS. 2 and 3 show surface images of MEA according to first and third embodiment of the present invention. In FIG. 2, (A) and (C) are Scanning Electron Microscopy (SEM) views photographed before the oxygen plasma etching and after the oxygen plasma etching of the MEA catalyst layer for about thirty minutes, respectively. FIG. 2B is a Transmission Electron Microscopy (TEM) view photographed before the oxygen plasma etching, and FIGS. 2D and 2E are TEM views photographed after the oxygen plasma etching for about thirty minutes. FIG. 3A is a SEM view and 3B and 3C are TEM views photographed after $CF_4$ plasma etching is performed on the MEA catalyst layer for about thirty minutes.

When one of the irradiation time of plasma, the acceleration voltage, and the etching pressure is controlled for the plasma etching, the size and shape of the nanosize protrusion with a high aspect ratio can be controlled. Also, in order to obtain a desired size and shape of a nanosize protrusion structure, the acceleration voltage may range from about −100 Vb to about −1,000 Vb, and the etching pressure may range from about 1 Pa to about 10 Pa.

Forming the hydrophobic thin film on the surface of the catalyst layer of the MEA may include forming a hydrophobic thin film on the catalyst support with a nano pattern of a high aspect ratio formed during etching. When the hydrophobic thin film is deposited on the etched surface of the catalyst support, a mixed gas of, e.g., hexamethyldisiloxane gas and Ar gas having a fraction ranging from about 0 volume % to about 30 volume %, or a hexamethyldisiloxane gas may be used. It should be noted, however, that the illustrative embodiments are not limited to a case where a hydrophobic thin film is deposited, and various methods can be used for forming the hydrophobic thin film.

The surface characteristics of the hydrophobic carbon thin film for increasing hydrophobicity may depend on the amount or ratio of Ar in a precursor gas and Radio Frequency (RF) power in a PECVD apparatus. Accordingly, the hydrophobicity can be controlled by controlling the power of the RF and the amount of Ar, and an improved thin film can be formed accordingly.

Hereinafter, exemplary embodiments will be described to help the understanding of the present invention, but the embodiments described below should not be construed as limiting the scope of the present invention. A process of manufacturing an MEA with superhydrophobicity will be described in detail in the examples below.

EXAMPLES

The following examples illustrate the invention and are not intended to limit the same.

Example 1

As commercialized Per-Fluorinated Sulfonic Acid (PFSA) MEA, an MEA in which carbon-supported Pt/C catalyst is used in both anode and cathode and the size of the carbon particles constituting a catalyst support are not uniform but range from about 10 nm to about 300 nm was prepared. The surface of a catalyst layer of the prepared MEA was treated by oxygen plasma etching using RF PECVD. In this case, only oxygen was used as a gas, and the oxygen plasma etching was performed with an etching pressure of about 10 Pa and an RF voltage which ranged from about −100 Vb to about −800 Vb.

Example 2

A carbon thin film mixed with silicon-oxygen for increasing hydrophobicity was formed on the surface of the catalyst layer of the MEA etched in Example 1. Specifically, hexamethyldisiloxane was used to deposit the hydrophobic thin film on the etched surface of the catalyst support by RF PECVD of about 13.56 MHz. In this case, the amount of Ar gas in a precursor gas was maintained at about 0 volume %, and the RF voltage was set to about −400 Vb. Also, the hydrophobic thin film was uniformly deposited to have a thickness of about 10 nm, and the internal pressure of a chamber was set to about 5 Pa.

Example 3

Similarly to Example 1, the surface of the catalyst layer of the MEA was treated by the plasma etching. However, the surface of the catalyst support was etched using $CF_4$ plasma instead of oxygen plasma.

Example 4

Similarly to Example 2, a carbon thin film was formed on the surface of the catalyst layer of the MEA to increase hydrophobicity, and the MEA of Example 3 was used.

Example 5

Figure 5:
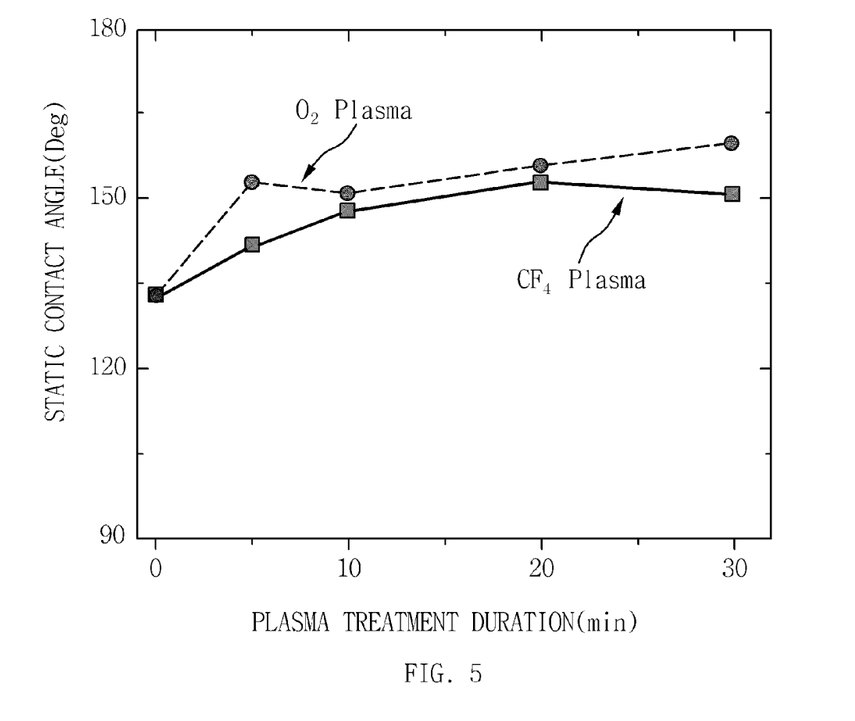
FIG. 5 is a graph illustrating a measurement result of a third test example.

After varying the treatment time of the oxygen plasma etching and the $CF_4$ plasma etching like in FIG. 5, MEA samples in which hydrophobic thin films were formed on the etched surfaces thereof were manufactured. In this case, the hydrophobic thin film was coated to have a thickness of about 5 nm

TEST EXAMPLES

Test Example 1

MEAs that were surface-treated in Examples 1 and 3 by the plasma etching were photographed before and after the etching for thirty minutes. The photographed images are shown in FIGS. 2 and 3.

Test Example 2

Figure 4:
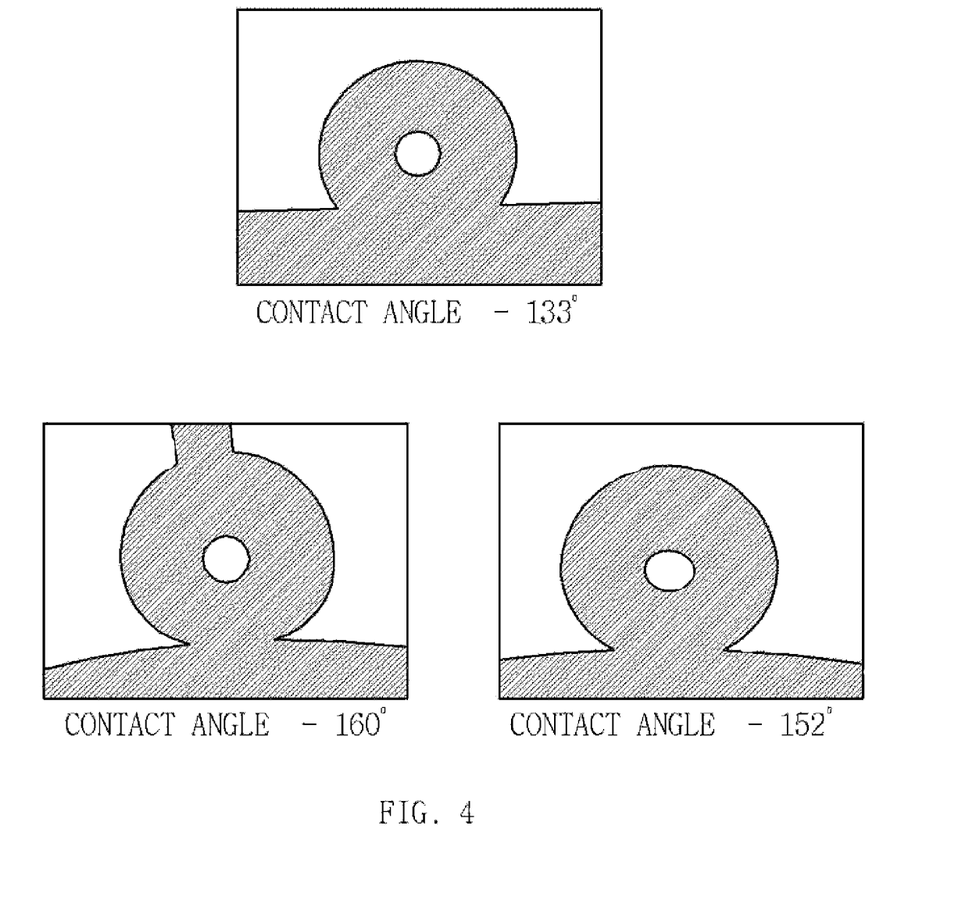
FIG. 4 is a view illustrating a measurement result of a second test example.

The contact angle of the surface of the MEA catalyst layer before the superhydrophobic surface treatment (in this case plasma etching) and the contact angle of the surface of the superhydrophobic MEA catalyst layer manufactured in Examples 2 and 4 were measured using a goniometer (Data Physics Instrument GmbH, OCA 20L). The measurement results are shown in FIG. 4. The instrument enables the measurement of the contact angle with an optical image of sessile droplet fixed on the surface. A droplet of about 5 μl was applied gently to the surface of the MEA catalyst layer to measure the static contact angle.

Test Example 3

The surface static contact angles of the MEA samples manufactured in Example 5 were measured using the goniometer. The measurement results are shown in FIG. 5. A droplet of about 5 μl was gently applied on the surface of the MEA catalyst layer to measure the static contact angle.

The oxygen plasma may etch carbon particles constituting the surface of the catalyst support by reacting with a carbon material. In this case, since the carbon material and the oxygen plasma may be combined to form carbon dioxide ($CO_2$) or a carbon monoxide (CO) gas, the surface of the catalyst support may be etched accordingly. Particularly, the surface of spherical carbon particles having a size of several tens to several hundreds of nanometer (nm) and constituting the catalyst support may be etched to form catalyst support particles having nano protrusion structure having a width of about 10 nm to about 20 nm and a length of about 100 nm to about 200 nm. In this case, the surface area of the catalyst support may increase by about seven to about fifteen times, compared with the surface area before the etching.

FIGS. 2A and 2C are high-magnification scanning electron microscopic photographs of the surface of the catalyst layer of the MEA before and after the oxygen plasma etching, respectively. FIGS. 2B (before etching) and 2D and 2E (after etching) are transmission electron microscopic photographs of the surface of the catalyst layer of the MEA before and after the oxygen plasma etching, respectively. Here, the photographs after the plasma etching of FIGS. 2C, 2D, and 2E are images photographed after the plasma etching for about thirty minutes.

FIG. 3 shows a scanning electron microscopic photograph A and transmission electron microscopic photographs B and C that were photographed after the $CF_4$ plasma etching of the MEA catalyst layer for about thirty minutes in Example 3.

As shown in FIG. 2A, it can be seen that the catalyst support has a spherical shape. In FIG. 2B, it can be seen that platinum (Pt) particles with a size of about 2 nm to about 3 nm are uniformly distributed over the catalyst support. As shown in FIG. 2C that is a photograph after the oxygen etching process, it can be seen that a nano pattern of a protrusion structure with a high aspect ratio was formed in the surface of the catalyst support. Also, as shown in FIGS. 2D and 2E, it can be seen that one side of the catalyst support was changed into a long needle like shape.

The nano pattern with a high aspect ratio and a long needle like shape may be shown due to the plasma etching speed with respect to metallic particles is much slower than the etching speed respect to carbon particles constituting the catalyst support. In other words, since the metallic particles serve as a sort of etching stop, surroundings of the metallic particles may not be well etched, but surroundings of the carbon particles may be quickly etched, forming a catalyst support with a high aspect ratio, parallel to the plasma incident direction (direction perpendicular to the surface).

Also, as shown in FIG. 3, even when $CF_4$ plasma is used instead of the oxygen plasma, a result similar to that of the oxygen plasma etching can be obtained. FIG. 3A is a SEM photograph illustrating the surface of an MEA catalyst layer after $CF_4$ plasma treatment for about thirty minutes, which shows that a nano pattern with a high aspect ratio is formed on the surface. However, when the oxygen plasma etching is used (Example 1), the nano pattern on the surface of the catalyst support may be formed into a needle like shape, and when $CF_4$ plasma etching is used (Example 3), the nano pattern on the surface of the catalyst support may be formed into a pillar like shape (see FIGS. 3B and 3C).

FIG. 4 is photographs illustrating measurement results of Test Example 2. Here, FIG. 4A is an optical microscopic photograph illustrating a droplet shape formed on the surface of the MEA catalyst layer, and FIGS. 4B and 4C are optical microscopic photographs illustrating a droplet shape formed on the surface of the catalyst layer coated with a hydrophobic carbon nano thin film after the oxygen plasma and $CF_4$ plasma treatments for about 30 minutes, respectively.

FIG. 5 is a graph illustrating the measurement results of Test Example 3, which shows the contact angles with droplets on the surface of the MEA catalyst layer according to the oxygen plasma etching and $CF_4$ plasma etching durations.

In Test Example 2, when viewing the measurement results of the characteristics of the hydrophobic surface of MEA, as shown in FIG. 4, the surface static contact angle of the MEA catalyst layer before the superhydrophobic surface treatment (see FIG. 4A) was about 133 degrees, but the surface static contact angles after the oxygen plasma etching and the hydrophobic thin film coating treatment (FIG. 4B) and after the $CF_4$ plasma etching and hydrophobic thin film coating treatment (FIG. 4C) were significantly increased to about 160 degrees and about 152 degrees, respectively. Accordingly, it can be seen that the hydrophobicity has increased. Also, the surface static contact angle can be adjusted according to the aspect ratio of the nano pattern and the formation condition of the hydrophobic carbon thin film. As shown in FIG. 5, it can be seen that the static contact angle can be controlled by adjusting the plasma etching treatment duration.

The reaction surface area and the hydrophobicity can be increased by forming a nano pattern with a high aspect ratio on the surface of the catalyst support using the manufacturing methods according to the exemplary embodiments of the present invention. Thus, an MEA with a superhydrophobic catalyst layer can be manufactured. Also, since the surface of the MEA has the self-cleaning and droplet-repellent functions, the MEA can be applied to fuel cells to smoothly discharge water generated from the electrochemical reaction of the fuel cell and thus to be utilized as an MEA surface material for maintaining the cell performance. Furthermore, the water discharge performance of the MEA can be significantly increased by increasing the hydrophobicity of the surface of the MEA catalyst layer up to superhydrophobicity.

In a membrane electrode assembly manufactured according to an embodiment of the present invention, since the reaction surface area can be widened and the contact angle with pure water can be significantly increased, the membrane electrode assembly can have the superhydrophobic surface characteristics. Thus, the membrane electrode assembly of the illustrative embodiment of the present invention has an increased area for an electrochemical reaction when applied to a fuel cell. Also, since the superhydrophobic surface has a self-cleaning function and a water repellent function, water produced during the electrochemical reaction can be smoothly discharged, thereby allowing the membrane electrode assembly to be utilized as a surface material for maintaining the performance of the cell. In addition, the membrane electrode assembly can be easily commercialized due to simplification of the process.

The invention has been described in detail with reference to exemplary embodiments thereof. However, it will be appreciated by those skilled in the art that changes may be made in these embodiments without departing from the principles and spirit of the invention, the scope of which is defined in the appended claims and their equivalents.

What is claimed is:

1. A method of manufacturing a membrane electrode assembly with enhanced hydrophobicity, the membrane electrode assembly formed with a polymer electrolyte membrane and catalyst layers of an anode and a cathode, the catalyst layers including a catalyst support and a catalyst supported thereon, the method comprising:
    forming a nano pattern on a surface of each of the catalyst layers via plasma etching, wherein the plasma etching etches portions of each of the catalyst layers; and
    forming a hydrophobic thin film on the nano pattern formed in the catalyst support.

2. The method of claim 1, wherein the forming of the nano pattern includes controlling a size and a shape of the nano pattern by adjusting at least one of a plasma irradiation duration, an acceleration voltage, and an etching pressure during the plasma etching.

3. The method of claim 1, wherein the acceleration voltage of plasma for the plasma etching ranges from about −100 Vb to about −1,000 Vb, and the etching pressure of the plasma ranges from about 1 Pa to about 10 Pa.

4. The method of claim 1, wherein the plasma etching is performed by one or a combination of an ion beam method, a hybrid plasma chemical deposition method and an atmospheric plasma method.

5. The method of claim 1, wherein the plasma etching is carried out by either Plasma-Enhanced Chemical Vapor Deposition (PECVD) or Plasma-Assisted Chemical Vapor Deposition (PACVD).

6. The method of claim 1, wherein the hydrophobic thin film comprises a hydrocarbon thin film including silicon and oxygen or a hydrocarbon thin film including fluorine.

7. The method of claim 1, wherein the hydrophobic thin film has a thickness of about 1 nm to about 100 nm.

8. The method of claim 1, wherein the nano pattern includes fine protrusion structures.

9. A membrane electrode assembly with enhanced hydrophobicity, comprising:
    a polymer electrolyte membrane;
    catalyst layers of an anode and a cathode disposed on surfaces of the polymer electrolyte membrane, the catalyst layers including a catalyst support and a catalyst supported therein, a nano pattern formed within a surface of each of the catalyst layers; and
    a hydrophobic thin film formed on the nano pattern of each of the catalyst layers, wherein a superhydrophobic surface is formed therefrom.

10. The membrane electrode assembly of claim 9, wherein the nano pattern includes fine protrusion structures.

11. The membrane electrode assembly of claim 9, wherein the hydrophobic thin film comprises a hydrocarbon thin film comprising silicon and oxygen or a hydrocarbon thin film comprising fluorine.

12. The membrane electrode assembly of claim 9, wherein the hydrophobic thin film has a thickness of about 1 nm to about 100 nm.

13. The method of claim 1, wherein the nano pattern has a fine protrusion structure such as a nano needle or a nano pillar having a width of 10 nm to 20 nm and a length of 100 nm to 1,000 nm.

14. The method of claim 1, wherein the nano pattern is formed by performing the plasma etching on a carbon powder surface having a spherical shape constituting the catalyst support.

15. The method of claim 1, wherein the nano pattern is formed to have an uneven structure that has nanosize protrusions or pores, on a carbon powder surface having a spherical shape constituting the catalyst support.

16. The method claim 1, wherein the catalyst support comprises generally spherically shaped carbon powder particles, and wherein the nano pattern is formed within the generally spherically shaped carbon powder particles.

17. The membrane electrode assembly of claim 9, wherein the catalyst support comprises generally spherically shaped carbon powder particles and wherein the nano pattern is formed within the generally spherically shaped carbon powder particles.

18. The method of claim 1, wherein the plasma etching of the catalyst layers provides a plasma etching speed with respect to the catalyst that is slower than a plasma etching speed of the catalyst support.

19. The method of claim 1, wherein the catalyst comprises metallic particles dispersed on the catalyst support, the metallic particles providing a plasma etching speed with respect to metallic particles that is slower than a plasma etching speed of the catalyst support.

* * * * *